(12) United States Patent
Fukushi et al.

(10) Patent No.: US 7,551,857 B2
(45) Date of Patent: Jun. 23, 2009

(54) OPTICAL TRANSMISSION SYSTEM

(75) Inventors: Tougo Fukushi, Ebetsu (JP); Hideaki Sugiya, Fujisawa (JP); Akira Yamamoto, Fukuoka (JP); Masanori Kondoh, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 371 days.

(21) Appl. No.: 11/177,590

(22) Filed: Jul. 11, 2005

(65) Prior Publication Data
US 2006/0013583 A1 Jan. 19, 2006

(30) Foreign Application Priority Data
Jul. 15, 2004 (JP) ............................. 2004-209205

(51) Int. Cl.
*H04B 10/02* (2006.01)
(52) U.S. Cl. ...................... 398/177; 398/173; 398/181; 398/33; 398/160; 398/18; 359/337; 359/341.3; 359/341.2
(58) Field of Classification Search .............. 398/173, 398/177, 181, 33, 30, 31, 37, 38, 11, 17, 398/15, 20, 22, 23, 24, 79, 13, 158, 159, 398/160; 359/341, 337, 341.2
See application file for complete search history.

(56) References Cited

U.S. PATENT DOCUMENTS

| | | | | |
|---|---|---|---|---|
| 6,344,915 | B1 * | 2/2002 | Alexander et al. | 398/115 |
| 6,359,708 | B1 * | 3/2002 | Goel et al. | 398/15 |
| 6,504,630 | B1 * | 1/2003 | Czarnocha et al. | 398/15 |
| 6,681,079 | B1 * | 1/2004 | Maroney | 398/15 |
| 2003/0011855 | A1 * | 1/2003 | Fujiwara | 359/177 |
| 2003/0035184 | A1 * | 2/2003 | Deguchi et al. | 359/177 |

* cited by examiner

*Primary Examiner*—Hanh Phan
(74) *Attorney, Agent, or Firm*—Hanify & King, P.C.

(57) ABSTRACT

An optical amplifier may be quickly returned from a shutdown state to a regular state after getting recovery information of a fault. Gain setting by ASE is conducted to the repeaters on the up-stream side during the shutdown state, by outputting ASE light with the same intensity as the WDM signal. Accordingly, before realizing the recovery of shutdown, the gain setting is completed with the light whose intensity is within the safe criterion. After realizing the recovery of shutdown, the optical transmission system can be returned quickly to the regular operating state after recovery of shutdown state.

3 Claims, 8 Drawing Sheets

PRIOR ART

Fig. 5

PRIOR ART

PRIOR ART

Fig. 8

PRIOR ART

OPTICAL TRANSMISSION SYSTEM

CROSS REFERENCE TO RELATED APPLICATION

This application is related to and claims priority to Japanese Application No. 2005-51404 filed Jul. 15, 2005 in the Japanese Patent Office, the contents of which are incorporated by reference herein.

BACKGROUND OF THE INVENTION

1. Field of the Invention

The present invention relates to an optical transmission system and more particularly to an optical transmission system which is capable of quickly shifting to the regular state from a safe light state in which the shutdown state of the transmission path is detected.

2. Description of the Related Art

In an optical transmission system using wavelength division multiplexing (WDM) signal lights, it is very important to control an optical amplifier in accordance with the number of multiplexed WDM signal lights. In the optical amplifier, the control modes of the automatic gain control and automatic level control are widely utilized.

Since the gain is kept at the constant level in the AGC (Automatic Gain Control) mode, a ratio of input level to output level of an optical amplifier is constant and an output level of an optical amplifier varies following an input level. For example, when the number of multiplexed WDM signal lightss input to an optical amplifier changes, a level of the input signal light changes, but since the gain of the signal light of each wavelength is constant, an output level of the signal light of each wavelength is not influenced.

Since a gain of an optical amplifier is controlled to make constant an output level of an optical amplifier in the ALC mode, the information on the number of multiplexed signals is necessary to control an output level of the signal light of each wavelength of the wavelength-multiplexed signal to the target value. For example, if the number of multiplexed input signal lights of the WDM is varied due to the signal add/drop process, an output level of the signal light of each wavelength also changes, resulting in the possibility of generation of transmission error.

In the optical amplifier used for the optical transmission system in which the number of multiplexed WDM signal lights to be transmitted varies, the control for switching the AGC mode and ALC (Automatic Level Control) mode is implemented.

Since the transmission light is possibly released to the external side of an optical fiber in the optical transmission system due to breakdown of the transmission path or a fault such as opening or the like of an optical connector by erroneous operation of a worker, an output of the transmission light must be kept within the safety criterion when a fault is detected.

There is known an automatic power shutdown (APSD) control in which the WDM light output is suspended only in the section wherein a fiber fault is generated by transmitting, if a fault in the transmission path is detected in the down-stream side of the fault point, the fault information to the up-stream side through the transmission path in the opposite direction in order to suppress an output of the optical amplifiers in the up-stream side. An example of this is shown in Japanese Patent Application JP-A No. 77056/2002.

In this APSD control, an output light intensity is maintained within the safety criterion by suspending output of the WDM light from the up-stream side station and an optical supervisory channel (OSC) control light is output. Since recovery from the fault can be detected by receiving the OSC light in the down-stream side of the fault point, the transmitting state can be returned to the regular state by canceling the APSD control in the up-stream side terminal through the opposite transmission line.

Figure 4:
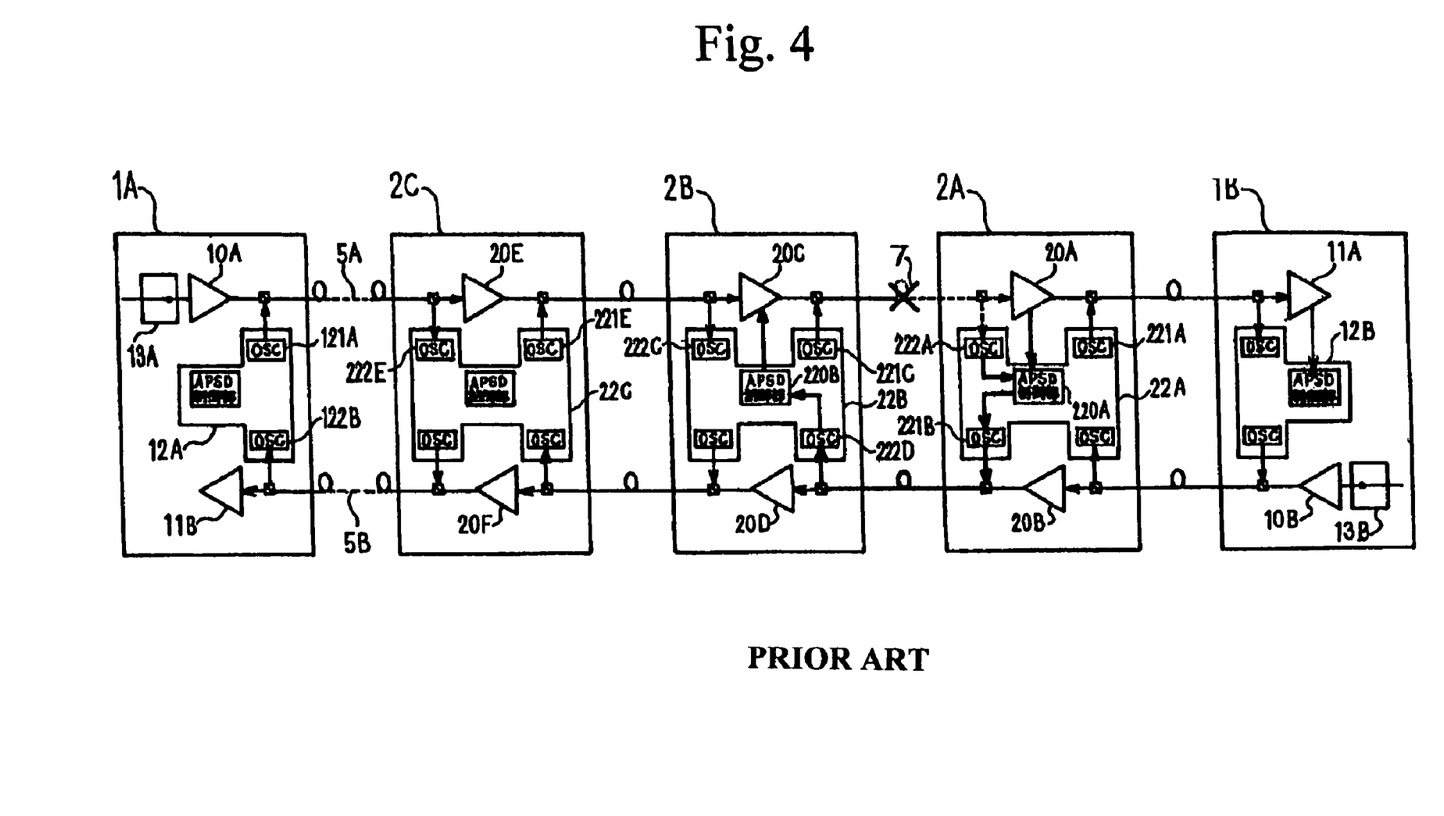
FIG. 4 is a diagram illustrating operations by APSD when shutdown of transmission path is detected in the optical transmission system based on the related art.

FIG. 4 illustrates flows of controls and signals when a fault occurs at the fault point 7 in the optical transmission path 5A in the optical transmission system in which optical transmission is performed between a terminal 1A and a terminal 1B through the optical transmission paths 5A and 5B and the repeaters 2A to 2C are provided in the course of the transmission paths.

In FIG. 4, the WDM signal light output from an optical switch 13A is amplified with a post-amplifier 10A and is then transmitted to the optical transmission path 5A. The transmitted WDM signal light is amplified with the optical amplifiers 20E, 20C, 20A of the repeaters 2C, 2B, 2A and is then input to a pre-amplifier 11A of the terminal 1B.

Moreover, the OSC light is output from an OSC transmitting unit 121A, in addition to the WDM signal light. Each repeater is also provided the OSC receiving units 222A, 222C, 222E and the OSC transmitting units 221A, 221C, 221E. In the terminal and repeater, the OSC signal is branched to the OSC receiving unit before input to an optical amplifier. These terminals and repeaters receive the supervisory control signal from the up-stream side, combine the OSC signals from the OSC transmitting unit, and then output the combined OSC signals to the down-stream side of the transmission path.

When a fault occurs at the fault point 7 in the optical transmission path 5A, the OSC receiving unit 222A of the repeater 2A in the down-stream side detects shutdown of the OSC signal, while the optical amplifier 20A detects shutdown of the main signal (WDM signal light) with an input light monitor (not illustrated). Accordingly, the control unit 22A of the repeater 2A detects generation of a fault.

The APSD control unit 220A transmits the APSD request signal to the repeater 2B using the OSC signal of the opposed transmission line. The APSD request signal is transmitted to the APSD control unit 220B from the OSC transmitting unit 221B via the OSC receiving unit 222D of the repeater 2B.

The APSD control unit 220B shuts down the optical amplifier 20C on the basis of the APSD request signal. Accordingly, the optical repeater 20C is shutdown and an output of the WDM light is suspended only in the section between the repeater 2B and the repeater 2A where a fault is generated in the optical transmission path 5A.

Here, the OSC light is transmitted from the OSC transmitting unit 221 and recovery of the fault at the fault point 7 can be detected by receiving the OSC light with the OSC receiving unit 222A.

In the case of returning to the regular mode from the shutdown state by the APSD control or the like and switching to the backup line from the working line because of generation of a fault, or in the case of newly constituting a network system, gain setting is necessary for each optical amplifier.

Here, there is also known the technology for setting the gain (gain setting by ASE) of an optical amplifier by utilizing the amplified spontaneous emission (ASE) light even if the signal light is not transmitted to the transmission path when the optical transmission system is constituted and/or when recovered from the defective state. An exmaple of this is shown in Japanese Patent Application JP-A No. 23437/2004).

Figure 5:
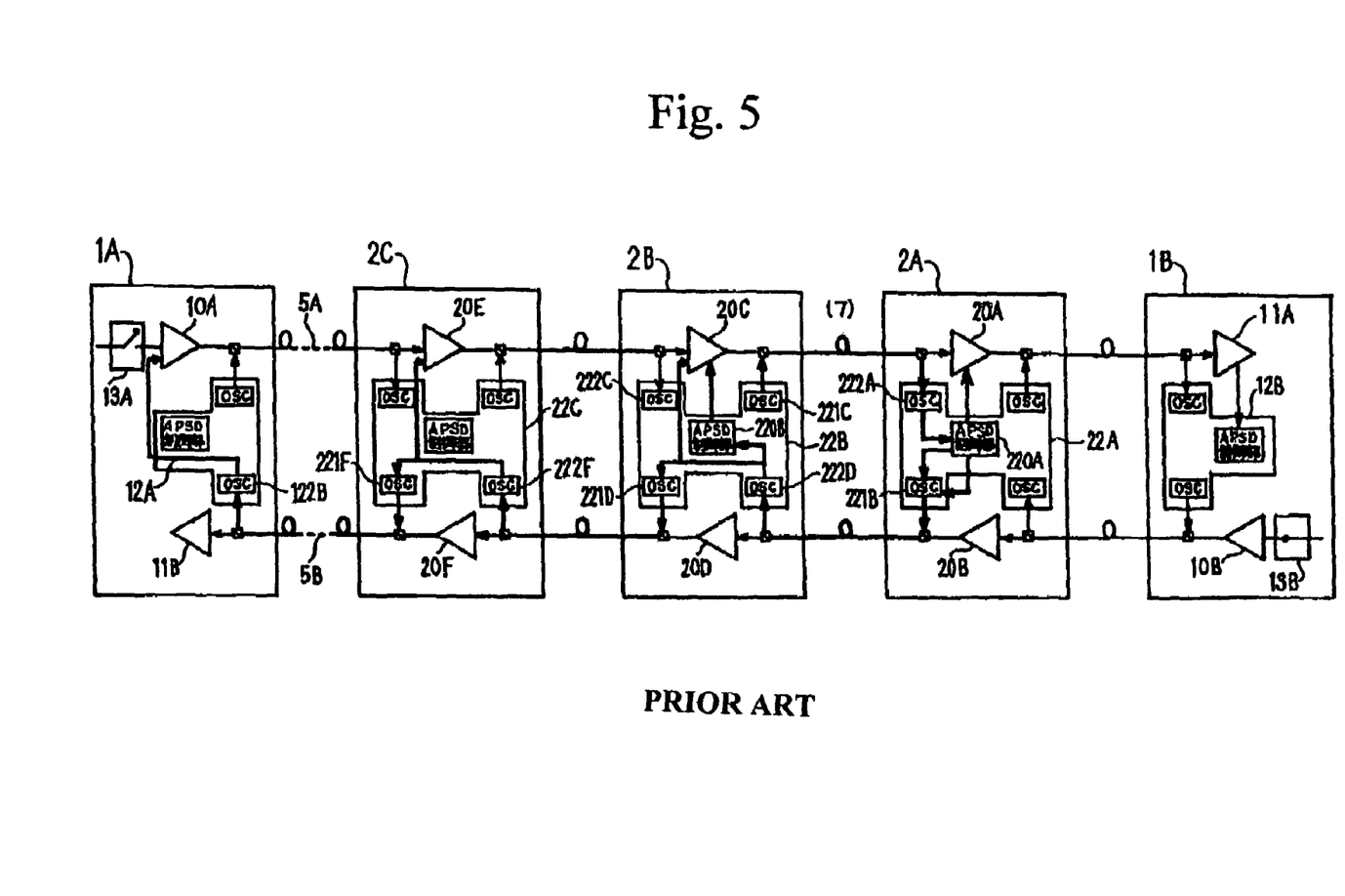
FIG. 5 is a diagram illustrating the ASE setting operation when shutdown of transmission path is recovered in the optical transmission system based on the related art.
Figure 6:
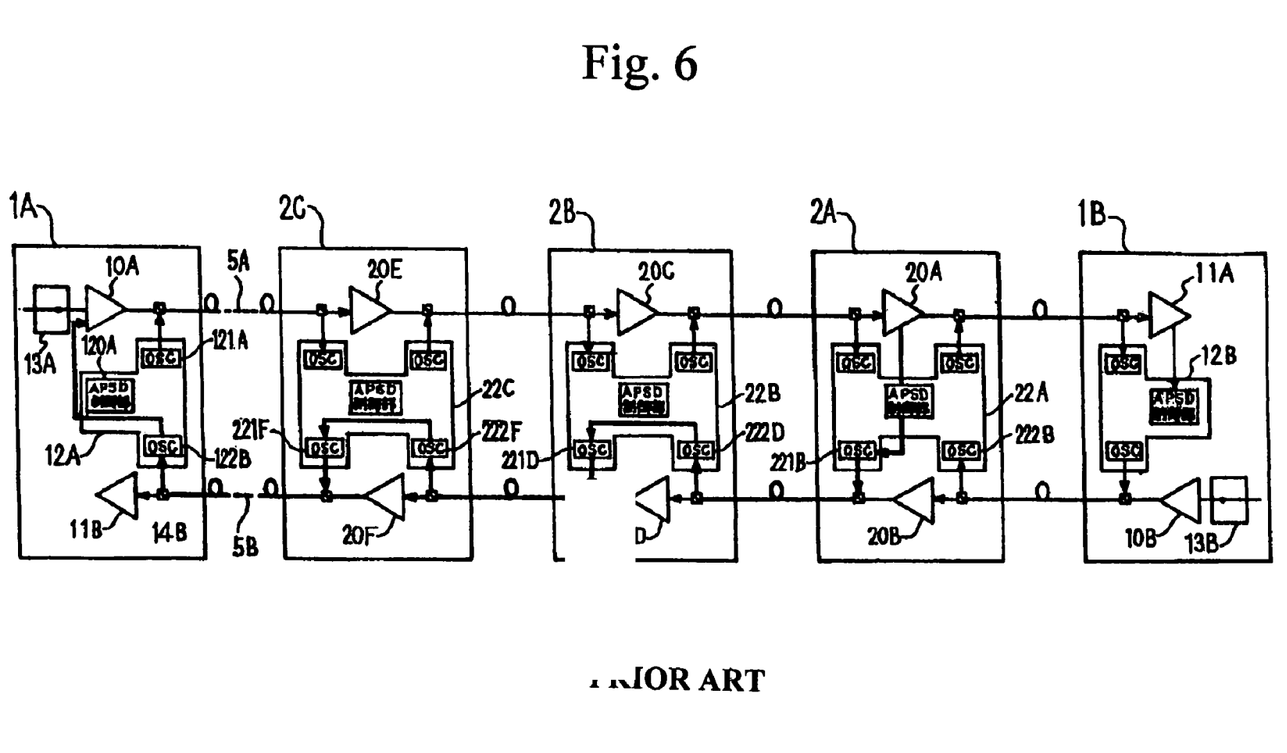
FIG. 6 is a diagram illustrating the ASE setting operation when shutdown of transmission path is recovered in the optical transmission system based on the related art.

FIG. 5 and FIG. 6 illustrate the procedures for setting the gain of each optical amplifier through gain setting by ASE when the fault at the fault point 7 is recovered from the shutdown state by the APSD control of FIG. 4.

When the fault at the fault point 7 is recovered in FIG. 5, the OSC light transmitted from the OSC transmitting unit 221C is received with the OSC receiving unit 222A and the control unit 22A of the repeater 2A detects recovery of fault at the fault point 7. The control unit 22A transmits the APSD canceling signal to the repeater 2B using the OSC signal of the opposed transmission line and also transmits the ASE setting request to the up-stream side terminal and the optical amplifier 20A. The optical amplifier 20A receives the ASE setting request and shifts to the ASE setting mode.

The APSD canceling signal is transmitted to the APSD control unit 220B from the OSC transmitting unit 221B through the OSC receiving unit 222D of the repeater 2B. The APSD control unit 220B cancels the shutdown state of the optical amplifier 20C on the basis of the APSD canceling signal. The optical amplifier 20C cancels the shutdown state with the APSD canceling signal and thereafter receives the ASE setting request to shift to the ASE setting mode.

The repeater 2C in the up-stream side also receives the ASE setting request via the OSC signal and the optical amplifier 20E shifts to the ASE setting mode.

When the terminal 1A receive the ASE setting request, the optical switch 13A shuts down the input WDM signal light to the post-amplifier 10A. The terminal amplifier 10A which has shifted to the ASE setting mode by receiving the ASE setting request controls the intensity of the excited light for the gain control in order, to output the ASE light in the intensity which is identical to that of the ASE light when a single light is amplified under the state that the input WDM signal light is shutdown.

The down-stream optical amplifier which has shifted to the ASE setting mode with the ASE light output from the termination amplifier 10A also controls the intensity of the excited light for the gain control in order to output the ASE light in the intensity which is identical to that of the ASE light when only a single light is amplified. When the gain control of the optical amplifier in the ASE setting mode is completed and the gain of the same amplifier is set, each optical amplifier transmits the gain setting end message through the OSC light of the opposed transmission line.

In FIG. 6, when the optical amplifier 20A of the repeater 2A located at the next stage of the fault point 7 shifts to the gain control from the ASE setting mode and sets the gain thereof, the OSC transmitting unit 221B transmits the gain setting end message with the OSC light on the opposed transmission line. When the terminal 1A receives the gain setting end message from the optical amplifier of the repeater 2A located at the next stage of the fault point 7, the optical switch 13A of the terminal 1A switches the input WDM signal light, which has been shutdown, to be transmitted to the post-amplifier 10A. Thereby, the light including the WDM light is transmitted from the terminal 1A.

When the optical switch 13 of the terminal 1A is switched for transmission of light, the optical amplifiers up to the optical amplifier 20A from the post-amplifier have already completed the gain setting by the ASE setting mode. Accordingly, the light including the WDM light is transmitted from the terminal 1A, resetting the regular operating state.

In above description, the intensity of the ASE light in the ASE setting mode is set identically to the intensity of the light when a single light is amplified. However, the ASE light intensity is enough when it can be detected with an input monitor of the optical amplifier located in the next stage and it enables setting of the gain even if the signal light does not exist.

The structure for detection of the shutdown state and recovery from the shutdown state has been described for the external transmission path of the terminal or repeater. Meanwhile, a unit structure is generally employed for each function in the WDM light transmitting apparatus.

For example, the unit including a pre-amplifier for amplifying the WDM optical signal with a receiving unit of the terminal is formed in separation from the unit including a demultiplexing unit for demultiplexing the amplified WDM optical signal, consideration should be taken also for a fault in the fiber connecting the units.

Figure 7:
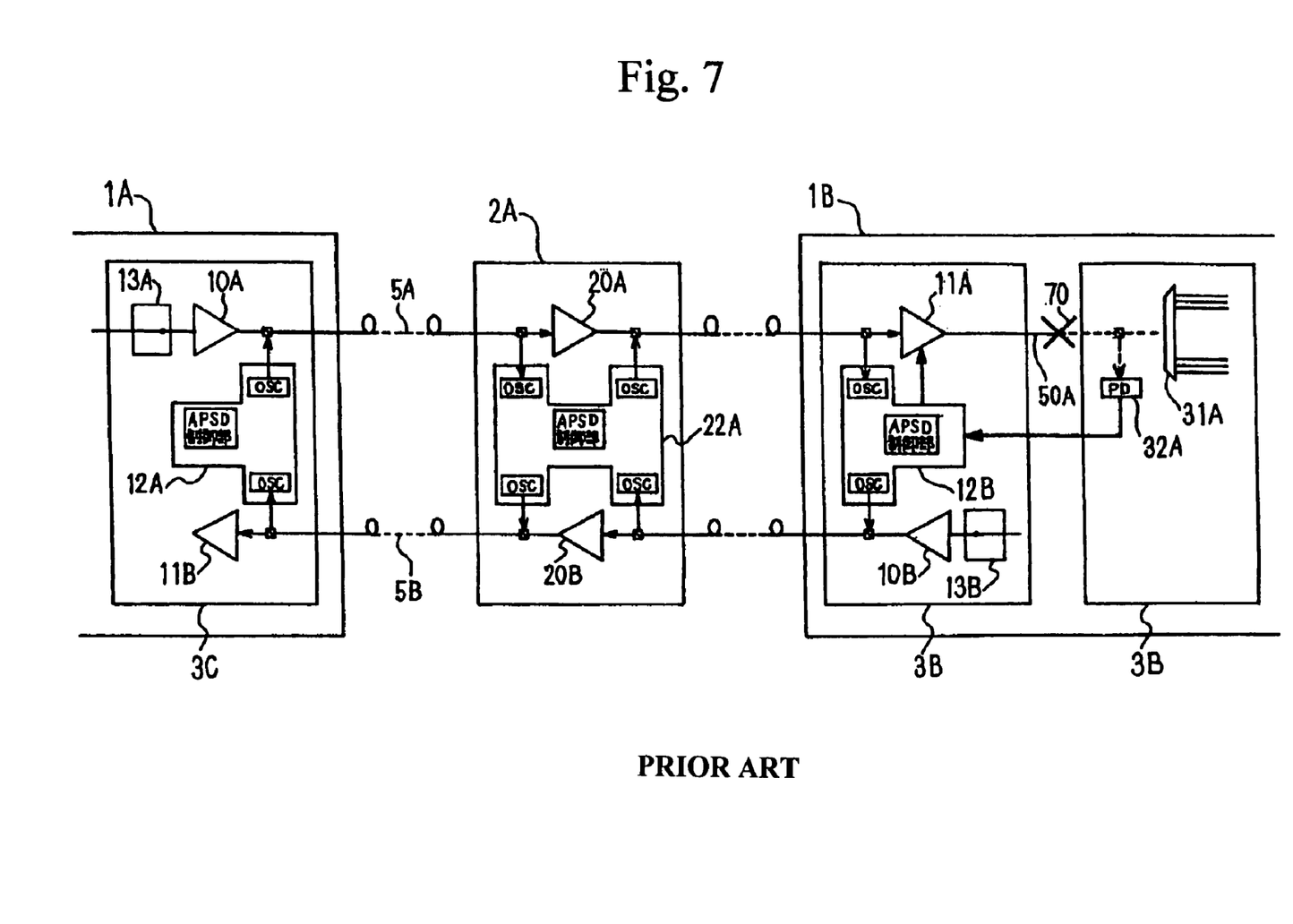
FIG. 7 is a diagram illustrating operations when shutdown of fiber connecting units of the terminal is detected in the optical transmission system based on the related art.
Figure 8:
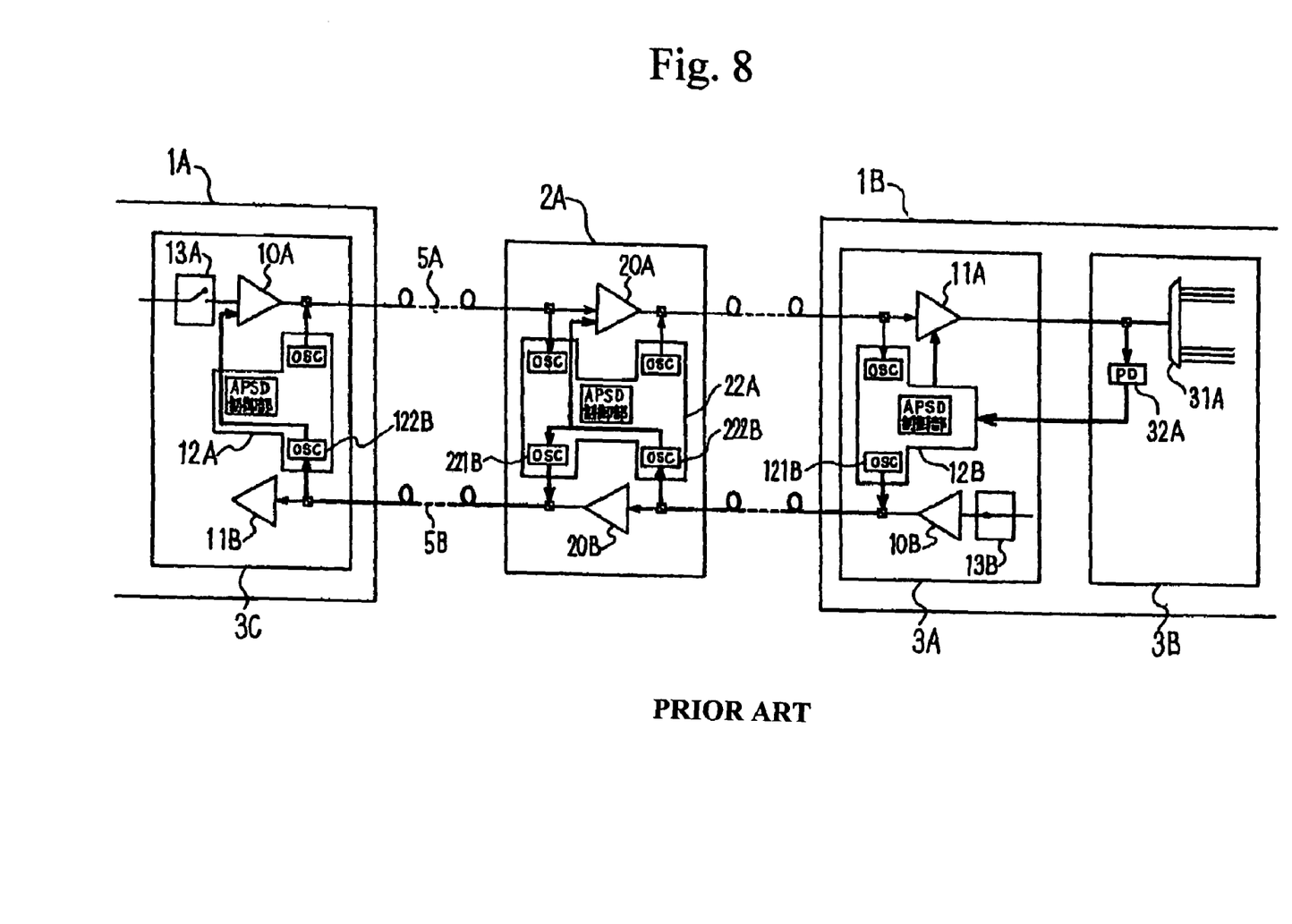
FIG. 8 is a diagram illustrating the ASE setting operation when shutdown of fiber connecting units of the terminal is recovered in the optical transmission system based on the related art.

FIG. 7 and FIG. 8 illustrate the procedures for detection and recovery of the shutdown state when a fault is generated in the optical fiber 50A connecting the unit 3A including the pre-amplifier 11A and the unit including the DEMUX unit 31A.

In FIG. 7, a fault in the fiber 50A is detected with a power detector (PD) 32A for monitoring input of the unit 3B. Based on the detection result of PD 32A, the pre-amplifier 11A performs the shutdown operation.

Since the OSC light is not transmitted to the fiber 50A, the fault in the fault point 7 is recovered by setting the pre-amplifier 11A to the safe light state for transmitting light of a level satisfying the safety criterion.

FIG. 8 illustrates the re-setting of the transmission system when a fault at the fault point 70 is recovered. When the fault is recovered, the light transmitted from the pre-amplifier 11A in the safe light state is received with the PD 32A. Accordingly, the control unit 12B detects recover of fault in the fault point 70.

The control unit 12B transmits the ASE setting request to the up-stream side terminals and pre-amplifier 11A using the OSC signal on the opposed transmission line. The pre-amplifier 11A shifts to the ASE setting mode by receiving the ASE setting request.

When the terminal 1A receives the ASE setting request, the optical switch 13A shuts down the input WDM signal light to the post-amplifier 10A. The post-amplifier 10A, having shifted to the ASE setting mode by receiving the input WDM signal light, controls the intensity of the excited light for the gain control in order to output the ASE light in the intensity which is identical to that of the ASE light when a single signal light is amplified under the state that the input WDM signal light is shutdown.

The optical amplifier in the down-stream side which has shifted to the ASE setting mode with the ASE light output from the post-amplifier 10A also controls the intensity of the excited light for gain control to output the ASE light in the intensity which is identical to that of the ASE light when the input WDM signal light is amplified. When the gain control of the optical amplifier in the ASE setting mode is completed and the gain thereof is set, each amplifier transmits the gain setting end message via the OSC light on the opposed transmission line.

The optical transmission systems illustrated in FIG. 4 to FIG. 6 have the problem that a longer time is required to set the gain for all optical amplifiers of the repeaters located in the next stage of the fault point from the post-amplifier of the terminal because the control by the APSD control is different from the gain control for recovery to the regular operating state.

Moreover, such optical transmission systems also have a problem in that the control is complicated because the control by the APSD control must be conducted in separation from the gain control such as the ASE setting or the like.

In the optical transmission system illustrated in FIG. 7 and FIG. 8, it is required to transmit the light in a level satisfying the safety criterion and to detect recovery of the shutdown state with a pre-amplifier because the OSC light is not transmitted to the fiber connecting the units.

Moreover, these transmission systems also have a problem that a longer time is required for total gain setting because the gain control such as the ASE setting or the like must be conducted from the post-amplifier located at the other end of the transmission path for the recovery from the shutdown state.

SUMMARY OF THE INVENTION

The present invention reduces the time needed to recover from a fault in an optical transmission system. An optical amplifier may be quickly returned from a shutdown state to a regular state after getting recovery information of a fault. Gain setting by ASE is conducted to the repeaters on the up-stream side during the shutdown state, by outputting ASE light with the same intensity as the WDM signal. Accordingly, before realizing the recovery of shutdown, the gain setting is completed with the light whose intensity is within the safe criterion. After realizing the recovery of shutdown, the optical transmission system can be returned quickly to the regular operating state after recovery of shutdown state.

In one embodiment of the present inventionm an optical transmission system comprises a first terminal transmitting a wavelength division multiplex signal light amplified by a post-amplifier to a first transmission path, a second transmission path opposite to the first transmission path transmitting the signal light from the second terminal and a plurality of repeaters provided in the first and the second transmission paths, having optical amplifiers amplifying the signal light from the first transmission path, wherein, when a fault in the first transmission path occurs between a first repeater located on an up-stream side and a second repeater located on a down-stream side and the second repeater detects this fault, the second repeater transmits fault information to the second transmission path, the repeaters located on the up-stream side from the first repeater for the first transmission path stops an amplifying operation of the signal light based on the fault information and transmits a stop request to the second transmission path, the first terminal stops transmission of the signal light on the basis of the stop request, controls the post-amplifier so that an intensity of an amplified spontaneous emission (ASE) light output by the post-amplifier can be detected by an input monitor of an optical amplifier located at a next stage and controls an intensity of an output light within a range satisfying a safety criterion, and transmits the ASE light to the first transmission path, and a repeater located on the up-stream side of the first transmission path from the first repeater controls, on the basis of the ASE light, an optical amplifier so that an intensity of the ASE light output by the optical amplifier can be detected with an input monitor of an optical amplifier located in a next stage and controls an intensity of the output light within a range for satisfying a safety criterion.

In one aspect of the present invention, the second repeater detects a recovery of the fault, the second repeater controls the optical amplifier so that the intensity of the ASE light output by the optical amplifier can be detected with the input monitor of the optical amplifier located in the next stage and the intensity of the output light within the range satisfying the safety criterion, and when the second repeater completes the control of the optical amplifier, the second repeater transmits completion information to the second transmission path and the first repeater starts transmission of the signal light based on the completion information.

In one embodiment of the present invention, a repeater provided in the course of a first transmission path and a second transmission path provided opposite to the first transmission path having a first optical amplifier amplifying a signal light from the first transmission path, wherein when fault information on a down-stream side of the first transmission path from the second transmission path is received, an amplifying operation of the signal light is stopped and the stop request is transmitted to the second transmission path, and when the ASE light transmitting signal is received from a terminal of the first transmission path, an optical amplifier is controlled so that an intensity of the ASE light output by the optical amplifier can be detected with an input monitor of the optical amplifier located at a next stage and controls the intensity within a range satisfying a safety criterion.

In one embodiment of the present invention, an optical transmission system comprises a first terminal operable to transmit a wavelength division multiplex signal light amplified with a post-amplifier to a first transmission path and receiving a signal light from a second transmission path opposite to the first transmission path, a second terminal operable to amplify the wavelength division multiplex signal light received from the first transmission path with a preamplifier, input the amplified wavelength division multiplex signal light to a branching filter for demultiplexing via a unit-to-unit fiber, and transmitting the signal light to the second transmission path, and a plurality of repeaters including optical amplifiers operable to amplify the signal lights from the first transmission path and provided in the course of the first and the second transmission paths, and wherein the second terminal includes a monitor operable to monitor the output light of the unit-to-unit fiber in the preceding stage of the branching filter, the second terminal stops an amplifying operation of the signal light of the preamplifier and transmits fault information to the second transmission path, the repeater stops an amplifying operation of the signal lights on the basis of the fault information and transmits a stop request to the second transmission path, the first terminal stops transmission of the signal light based on the stop request, controls the post-amplifier so that an intensity of an ASE light output by the post-amplifier can be detected with an input monitor of an optical amplifier located at the next stage and controls the intensity in a range satisfying a safety criterion, and transmits the ASE light transmitting signal to the first transmission path, and the repeater controls the optical amplifier based on a naturally emitted light transmitting signal so that an intensity of the naturally emitted light by the optical amplifier can be detected with the input monitor of the optical amplifier and controls the intensity within the range satisfying the safety criterion.

In one aspect of the present invention, the monitoring means has detected recovery of the fault, the second repeater transmits completion information to the second transmission path and the first repeater starts transmission of signal light based on the completion information.

According to the present invention, since the gain control for returning the regular operating state can be realized in parallel under the safe light state after detection of a fault in the transmission path, the regular operating state can be recovered quickly after recovery from the fault.

Moreover, since the control for the safe light state and the gain control may be conducted simultaneously, the control can be simplified.

Spread of shutdown state can be detected and the regular state can be returned quickly after recovery from a fault, without separately providing a transponder unit, for the fault of fiber connecting the units wherein the supervisory control light is not transmitted.

DETAILED DESCRIPTION OF THE INVENTION

The embodiments for carrying out the present invention will be described with reference to the accompanying drawings.

[1] Description of the First Embodiment

Figure 1:
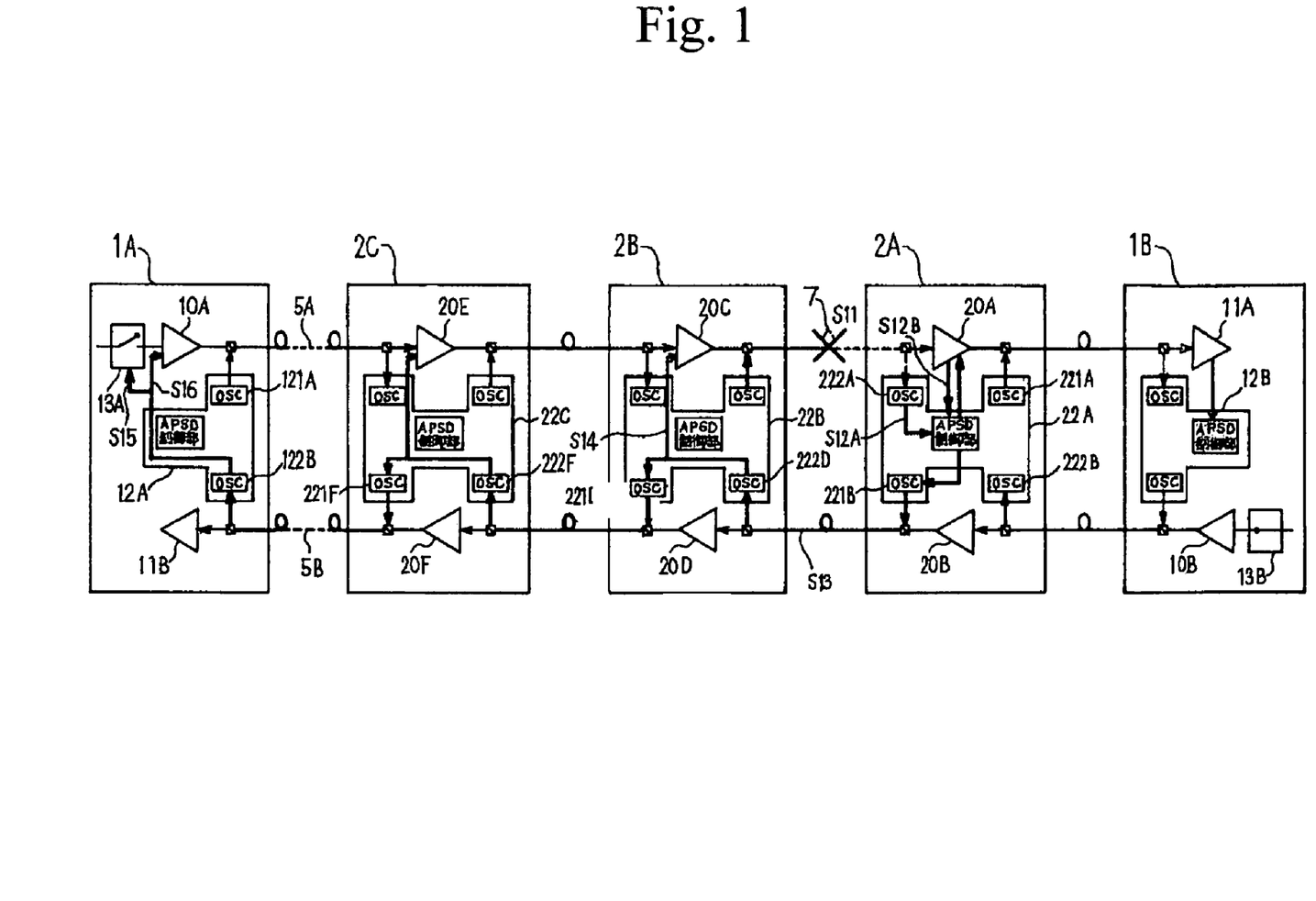
FIG. 1 is a diagram illustrating operations when shutdown of the transmission path is detected in the optical transmission system of the present invention.

FIG. 1 illustrates an optical transmission system of a first embodiment of the present invention. In the optical transmission system illustrated in FIG. 1, optical transmission is conducted between a terminal 1A and a terminal 1B using an optical transmission path 5A and an optical transmission path 5B forming the opposite transmission line and repeaters 2A to 2C are provided in the course of the transmission paths.

The terminal 1A comprises an optical switch 13A to which the WDM signal light to be transmitted is input, a post-amplifier 10A to amplify the light input from the optical switch, and a pre-amplifier 11B to amplify the signal light input from the optical transmission path 5B. Moreover, a control unit 12A comprises an OSC transmitting unit 121A to output the OSC light to the optical transmission path 5A and an OSC receiving unit 122B to receive the OSC light from the optical transmission path 5B. Similarly, the terminal 1B comprises an optical switch 13B, a post-amplifier 10B, a pre-amplifier 11A, and a control unit 12B.

Moreover, the repeater 2A comprises optical amplifiers 20A, 20B for amplifying the lights to be transmitted through the transmission paths 5A, 5B and a control unit 22A. The control unit 22A comprises an OSC transmitting unit 221A to output the OSC light to the optical transmission path 5A, an OSC receiving unit 222A to receive the OSC light from the optical transmission path 5A, an OSC transmitting unit 221B to output the OSC light to the optical transmission path 5B, and an OSC receiving unit 222B to receive the OSC light from the optical transmission path 5B.

Structures of the repeaters 2B, 2C are also similar to that of the repeater 2A and comprise optical amplifiers for the lights transmitted through the optical transmission paths 5A, 5B and control units.

Operation of the optical transmission system of FIG. 1, control and flow of signal when a fault is generated at the fault point 7 in the optical transmission path 5A will be described below.

In FIG. 1, the WDM signal light output from the optical switch 13A is amplified with the post-amplifier 10A and is then transmitted to the optical transmission path 5A. The WDM signal light transmitted is amplified with the optical amplifiers 20E, 20C, 20A of the repeaters 2C, 2B, 2A and is then input to the pre-amplifier 11A of the terminal 1B.

Moreover, the OSC light is output, in addition to the WDM signal light, from the OSC transmitting unit 121A of the terminal 1A and the supervisory control signal is transmitted by the OSC receiving unit and OSC transmitting unit of each repeater.

When a fault is generated at the fault point 7 in the optical transmission path 5A (S11), the OSC receiving unit 222A detects shutdown of the OSC signal (S12A) in the repeater 2A as the repeater located at the down-stream side of the fault point and the optical amplifier 20A detects the shutdown state of the main signal (WDM signal light) with an input optical monitor (not illustrated). Accordingly, the control unit 22A of the repeater 2A detects generation of a fault.

In this embodiment, the control unit 22A of the repeater 2A having detected generation of a fault sends the ASE setting request, namely conducts gain setting to the optical amplifier of the repeater or terminal located at the up-stream side of the optical transmission path 5A using the ASE light output with the optical amplifier through the optical transmission path 5B opposed to the optical transmission path 5A having generated a fault (S13). Namely, the ASE setting request is used as the fault information.

The control unit 22A transmits the ASE setting request to the repeater 2B using the OSC signal of the opposed transmission line. The ASE setting request is transmitted to the control unit 22B from the OSC transmitting unit 221B via the OSC receiving unit 222D of the repeater 2B.

The optical amplifier 20C shifts to the ASE setting mode on the basis of the ASE setting request (S14) from the control unit 22B.

The optical amplifier 20C having shifted to the ASE setting mode conducts the shutdown process. Accordingly, output of optical signal is suspended in the section between the repeater 2B and repeater 2A in which a fault of optical transmission path 5A is generated.

When the shutdown process of the optical amplifier 20C is completed, the signal light transmission end request is transmitted to the post-amplifier 10A of the terminal 1A via the OSC transmitting unit 221D.

Similarly, the optical repeater in the up-stream side of the repeater 2B shifts to the ASE setting mode by receiving the ASE setting request, shuts down the optical amplifier to stop output of the signal light and also transmits the stop request to the post-amplifier 10A of the terminal 1A.

When the terminal 1A receives the stop request, the optical switch 13A shuts down the input WDM signal light to the post-amplifier 10A (S15). The post-amplifier 10A having shifted to the ASE setting mode by receiving the ASE setting request (S16) controls the intensity of the excited light for gain control to output the ASE light in the intensity which is identical to that of the signal light when a single signal light is amplified under the state that the input WDM signal light is shutdown. Accordingly, the ASE light transmitting signal is transmitted to the repeater in the down-stream side using the OSC light of the optical transmission path 5A.

The optical amplifier in the down-stream side in the shutdown state having shifted to the ASE setting mode controls, upon reception of the ASE optical light transmitting signal transmitted from the terminal 1A, the intensity of the excited light for gain control using the ASE light output from the post-amplifier 10A in order to output the ASE light of an intensity which is identical to that of the light when a signal light is amplified. When the gain of the optical amplifier in the ASE setting mode is set with completion of the gain control thereof, the optical amplifiers 20E, 20C up to the repeater 2B just in the up-stream side of the fault point 7 transmit the gain setting end message using the OSC light of the opposed transmission line.

In this operating process, the optical amplifier 20C shifts, from the shutdown state, to the state to control the intensity of the excited light and the gain in order to output the ASE light of the intensity which is identical to that of the signal light when a single light is amplified. In any state, the light output from the fault point 7 is within the range of the safety criterion.

Moreover, in the shutdown state, recovery of fault at the fault point 7 can be detected by receiving the OSC light with the OSC receiving unit 222A and by receiving the ASE light due to the input optical monitor or the like (not illustrated) of the optical amplifier 20C under the state that the gain setting has been completed.

Therefore, the optical amplifiers up to the optical amplifier 20C of the repeater 2B located in the up-stream side of the fault point 7 have completed the gain setting under the safe light state after detection of the fault at the fault point 7.

Figure 2:
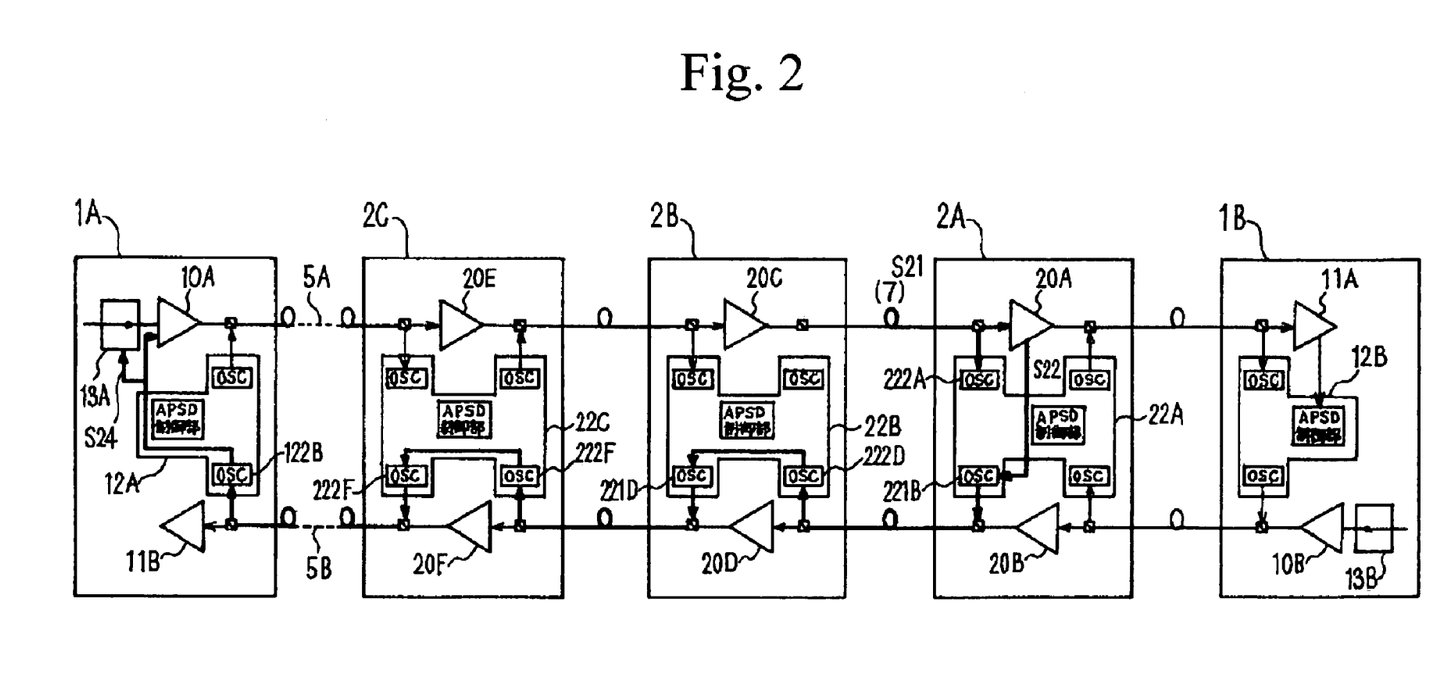
FIG. 2 is a diagram illustrating operations when the fault in the transmission path is recovered in the optical transmission system of the present invention.

Next, control and flows of signals when the fault in the fault point 7 is recovered will be described below.

In FIG. 2, when the fault in the fault point 7 is recovered (S21), the ASE light output from the optical amplifier 20C having completed the gain setting is received with the optical amplifier 20A and the control unit 22A of the repeater 2A detects recovery of the fault at the fault point 7 (S22). The control unit 22A performs the ASE setting to the optical amplifier 20A and transmits the gain setting end message using the OSC light on the opposite transmission line when the gain setting is completed (S23).

When the gain setting end message of the optical amplifier 20A of the repeater 2A is received by the terminal 1A, the optical switch 13A of the terminal 1A switches the input WDM light in the shutdown state to pass to the post-amplifier 10A. Thereby, the light including the WDM signal light is transmitted from the terminal 1A.

When the optical switch 13A of the terminal 1A is switched to transmit the light, the optical amplifiers up to the optical amplifier 20A from the post-amplifier 10A are reset to regular operating state by transmitting the light including the WDM light from the terminal 1A because these amplifiers have completed the gain setting based on the ASE setting mode.

As described above, the optical transmission system of the first embodiment uses the ASE setting request as the fault information and thereby completes the gain setting of the optical amplifiers in the up-stream side of the fault point in the safe light state. Therefore, the time required until start of the regular operating state from recovery of a fault can be shortened, when the fault is recovered, because the regular operating state can be restarted by conducting the gain setting for ASE setting to the optical amplifier of the repeater just in the down-stream side of the fault point and then transmitting the gain setting end message to the terminal.

Moreover, each optical repeater is not required to provide the control mode for APSD when it is provided with only the ASE setting mode. Accordingly, the structure for controlling the optical amplifier in the repeater may be simplified.

[b] Description of Second Embodiment

Figure 3:
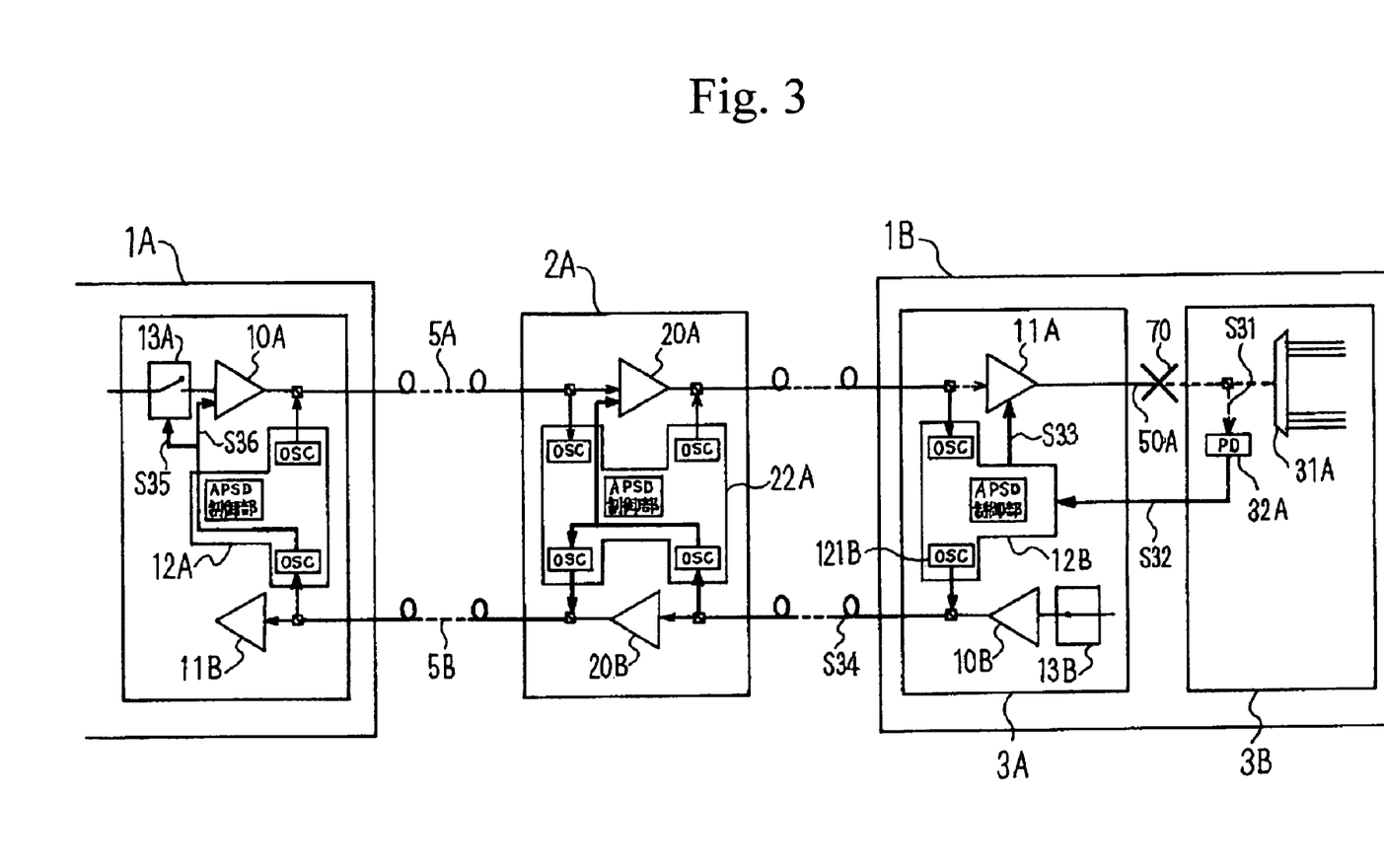
FIG. 3 is a diagram illustrating operations when shutdown of fiber connecting units of terminal is detected in the optical transmission system of the present invention.

FIG. 3 illustrates a structure of a second embodiment of the present invention and procedures for detecting the shutdown state and recovery when a fault is generated in the fiber connecting the units in a receiving terminal formed in the unit structure for each function.

In FIG. 3, a terminal 1B comprises a unit 3A including a pre-amplifier 11A and a unit 3B including a demultiplexing unit 31A. The units 3A and 3B are connected with a fiber 50A.

When a fault is generated at a fault point 70 of the fiber 50A, the fault in the fiber 50A is detected with a PD 32A for monitoring input of the unit 3B (S31) The fault information is transmitted to the unit 3A on the basis of the detection result of the PD 32A (S32).

When a control unit 12B of the unit 3A detects the fault information for the fiber 50A, the pre-amplifier 11A shifts to the ASE setting mode (S34) and conducts the shutdown operation.

Moreover, the control unit 12B transfers the ASE setting request to the repeaters in the up-stream side using the OSC signal of the opposite transmission line.

When the shutdown process of an optical amplifier 20C is completed, the stop request is transmitted to a post-amplifier 10A of a terminal 1A via an OSC transmitting unit 121B.

An optical repeater in the transmission path shifts to the ASE setting mode by receiving the ASE setting request to shutdown in view of stopping an output of the signal light. The optical repeater also transmits the stop request to the post-amplifier 10A of the terminal 1A.

When the terminal 1A receives the signal light transmission stop request, an optical switch 13A shuts down the input WDM signal light to the post-amplifier 10A (S35). The post-amplifier 10A having shifted to the ASE setting mode by receiving (S36) the ASE setting request controls the intensity of the excited light for the gain control in order to output the ASE light of an intensity which is identical to that of the signal light when a single signal light is amplified under the state that the input WDM signal light is shutdown. Thereby, the ASE light transmitting signal can be transmitted to the repeater in the down-stream side through the OSC light of the optical transmission path 5A.

When the optical amplifier in the down-stream side in the shutdown state which has shifted to the ASE setting mode controls, upon reception of the ASE light transmitting signal transmitted from the terminal 1A, the intensity of the excited light for the gain control with the ASE light output from the post-amplifier 10A in order to output the ASE light in an intensity which is identical to that of the signal light when a single signal light is amplified. When the gain control of the optical amplifier in the ASE setting mode is completed and the gain is set, the optical amplifier of the repeater transmits the gain setting end message through the OSC light of the opposed transmission line.

Here, the pre-amplifier 11A in the unit 3A controls with the gain control the intensity of the excited light with the ASE light transmitting signal from the terminal 1A in order to output the ASE light having an intensity which is identical to that of the light when a single signal light is amplified. However, the gain setting end message is not transmitted until the fault in the fault point 70 is recovered.

In above operation process, the pre-amplifier 11A shifts, from the shutdown state, to the state to control for the gain control the intensity of the excited light in order to output the ASE light in an intensity which is identical to that of the signal light when a single signal light is amplified. In any state, the light output from the fault point 70 is within the range of the safe light criterion.

Moreover, under the state having completed the gain setting, PD 32A detects recovery of the fault at the fault point 70. Namely, in the safe light state in which the gain setting of the pre-amplifier 11A has completed after detection of the fault at the fault point 70, the gain setting of the optical amplifier and pre-amplifier 11A of the repeater has been completed.

When the fault at the fault point 70 is recovered, the ASE light output from the pre-amplifier 11A which has completed the gain setting is received with the PD32A to detect recovery of the fault at the fault point 70.

When the gain setting of the pre-amplifier 11A is completed, the control unit 12B conducts ASE setting of the optical amplifier 20A and when the gain setting is completed, the control unit 12B transmits the gain setting end message using the OSC light in the opposite transmission line.

When the terminal 1A receives the gain setting end message of the pre-amplifier 11A of the terminal 2B, the optical switch 13A of the terminal 1A switches the input WDM signal light, in the shutdown state, to the post-amplifier 10A to the transmitting state and thereby transmits the light including the WDM light from the terminal 1A.

When the optical switch 13A of the terminal 1A is switched for transmission of light, since the optical amplifiers up to the pre-amplifier 11A from the post-amplifier 10A have completed the gain setting based on the ASE setting, the light including the WDM signal light is transmitted from the terminal 1A and thereby the regular operating state is performed again.

As described above, in the optical transmission system of the second embodiment, the regular operating state may be started again by transmitting the gain setting end message to the terminal when the fault is recovered. Accordingly, the time required until the regular operating state from recovery of fault can be shortened.

Moreover, when only the ASE mode is included in the pre-amplifier, it is no longer required to provide the control mode for transmission of the safe light. Accordingly, the structure for controlling the optical amplifier provided in the pre-amplifier can be simplified.

The intensity of the ASE light in the ASE setting is set identically to that of the signal light when a single signal light is amplified in the above description. However, the intensity of the ASE light can be detected with an input monitor of the optical amplifier located at the next stage. This is sufficient intensity of the ASE light that it can set the gain even when the light does not exist.

The invention claimed is:

1. An optical transmission system comprising:
    a first terminal transmitting a wavelength division multiplex signal light amplified by a post-amplifier to a first transmission path;
    a second transmission path opposite to the first transmission path transmitting a signal light from a second terminal; and
    a plurality of repeaters provided in the first and the second transmission paths, having optical amplifiers amplifying the signal light from the first transmission path;
    wherein,
    when a fault in the first transmission path occurs between a first repeater located on an up-stream side and a second repeater located on a down-stream side and the second repeater detects this fault, the second repeater transmits fault information to the second transmission path;
    the repeaters located on the up-stream side from the first repeater for the first transmission path stop an amplifying operation of the signal light based on the fault information and transmit a stop request to the second transmission path;
    the first terminal stops transmission of the signal light on the basis of the stop request, controls the post-amplifier so that an intensity of an amplified spontaneous emission (ASE) light output by the post-amplifier can be detected by an input monitor of an optical amplifier located at a next stage and controls an intensity of an output light within a range satisfying a safety criterion, and transmits the ASE light to the first transmission path; and
    a repeater located on the up-stream side of the first transmission path from the first repeater controls, on the basis of the ASE light, an optical amplifier so that an intensity of the ASE light output by the optical amplifier can be detected with an input monitor of an optical amplifier located in a next stage and controls an intensity of an output light within a range for satisfying a safety criterion.

2. The optical transmission system according to claim 1, wherein when the second repeater detects a recovery of the fault, the second repeater controls the optical amplifier so that the intensity of the ASE light output by the optical amplifier can be detected with the input monitor of the optical amplifier located in the next stage and the intensity of the output light within the range satisfying the safety criterion, and when the second repeater completes the control of the optical amplifier, the second repeater transmits completion information to the second transmission path and the first repeater starts transmission of the signal light based on the completion information.

3. An optical transmission system comprising:
    a first terminal operable to transmit a wavelength division multiplex signal light amplified with a post-amplifier to a first transmission path and receiving a signal light from a second transmission path opposite to the first transmission path;
    a second terminal operable to amplify the wavelength division multiplex signal light received from the first transmission path with a preamplifier, input the amplified wavelength division multiplex signal light to a branching filter for demultiplexing via a unit-to-unit fiber, and transmitting a signal light to the second transmission path; and
    a plurality of repeaters including optical amplifiers operable to amplify the signal lights from the first transmission path and provided in the course of the first and the second transmission paths;
    wherein the second terminal includes a monitor operable to monitor the output light of the unit-to-unit fiber in the preceding stage of the branching filter;
    the second terminal stops an amplifying operation of the signal light of the preamplifier and transmits fault information to the second transmission path;
    the repeaters stop an amplifying operation of the signal lights on the basis of the fault information and transmit a stop request to the second transmission path;
    the first terminal stops transmission of the signal light based on the stop request, controls the post-amplifier so that an intensity of an ASE light output by the post-amplifier can be detected with an input monitor of an optical amplifier located at the next stage and controls the intensity of an output light in a range satisfying a safety criterion, and transmits the ASE light transmitting signal to the first transmission path; and a repeater controls an optical amplifier based on the ASE light transmitting signal so that an intensity of the ASE light output by the optical amplifier can be detected with an input monitor of an optical amplifier located in a next stage and controls an intensity of an output light within a range satisfying a safety criterion.

* * * * *